(12) United States Patent
Papp (10) Patent No.: US 10,705,324 B2
(45) Date of Patent: Jul. 7, 2020

(54) HIGH-EFFICIENCY OBLIQUE ILLUMINATION SYSTEM FOR FLUORESCENCE EXCITATION AND DETECTION

(71) Applicant: Andrew A. Papp, Los Angeles, CA (US)

(72) Inventor: Andrew A. Papp, Los Angeles, CA (US)

(*) Notice: Subject to any disclaimer, the term of this patent is extended or adjusted under 35 U.S.C. 154(b) by 307 days.

(21) Appl. No.: 15/175,060

(22) Filed: Jun. 7, 2016

(65) Prior Publication Data

US 2017/0351076 A1 Dec. 7, 2017

(51) Int. Cl.
| | | |
|---|---|---|
| *G02B 21/16* | (2006.01) | |
| *G02B 5/20* | (2006.01) | |
| *G02B 21/08* | (2006.01) | |
| *G02B 27/30* | (2006.01) | |

(52) U.S. Cl.
CPC .............. *G02B 21/16* (2013.01); *G02B 5/20* (2013.01); *G02B 21/08* (2013.01); *G02B 27/30* (2013.01)

(58) Field of Classification Search
CPC ........ G02B 21/16; G02B 21/08; G02B 21/24; G02B 21/22; G02B 21/06; G02B 21/26; G02B 5/20; G02B 25/002; G02B 26/007; G02B 26/008; G02B 27/30; G01N 21/63; G01N 21/64; G01N 21/65
USPC ....... 359/368, 369, 385, 390, 391, 808, 889, 359/891
See application file for complete search history.

(56) References Cited

U.S. PATENT DOCUMENTS

| | | | | |
|---|---|---|---|---|
| 3,428,387 A | * | 2/1969 | Chambers | G02B 21/241 108/137 |
| 6,414,805 B1 | * | 7/2002 | Reichman | G02B 21/06 359/351 |
| 7,321,462 B2 | * | 1/2008 | Yamamoto | G02B 21/0088 359/368 |
| 7,502,164 B2 | | 3/2009 | Lytle | |
| 8,901,514 B2 | * | 12/2014 | Lee | G01N 21/6452 250/459.1 |
| 2007/0103682 A1 | * | 5/2007 | Yoo | G01J 3/02 356/318 |
| 2007/0153372 A1 | | 7/2007 | Mazel | |
| 2013/0099120 A1 | * | 4/2013 | Chan | G01N 15/1463 250/338.1 |

OTHER PUBLICATIONS

Macleod, H. A., "Thin Film Optical Filters", Hilger, London, 1969, pp. 111-153.

(Continued)

*Primary Examiner* — Jie Lei (57) ABSTRACT

Disclosed are a method and associated apparatus for efficiently exciting and detecting fluorescence. In a disclosed preferred embodiment, excitation lamp modules with multiple solid-state light sources shone at different oblique angles, such that multiple-beams converge in a single plane, are combined with appropriate emission filters that block the excitation light wavelengths while passing the emission wavelengths. A multitude of such modules are combined on a slider that can be accurately positioned in front of an observation point, such as a microscope's objective lens, external to the microscope, via a novel magnetic detent system, allowing for the rapid switching between the analysis of different fluorophores.

19 Claims, 5 Drawing Sheets

(56) References Cited

OTHER PUBLICATIONS

Mazel C., "Stereo Microscope Fluorescence Adapter," [online] [retrieved on Jun. 1, 2016] [Retrieved from the internet at www.nightsea.com/products/stereomicroscope-fluorescence-adapter/ ] pp. 1-2. (pdf file included with IDS).

Cree Inc., "Cree Xlamp XP-E2 LEDs" [online] [retrieved on Jun. 1, 2016] [Retrieved from the internet at www.cree.com/~/media/files/cree/LED-Components-and-Modules/Xlamp/Data-and-Binning/XLampXPE2.pdf ] (pdf file included with IDS).

Cree Inc., "XLamp LED Electrical Overstress" [online] [retrieved on Jun. 1, 2016] [Retrieved from the internet at www.cree.com/~/media/Files/Cree/LEDComponentsandModules/XLamp/XLampApplicationNotes/XLamp_Elec_Overstress.pdf ] (pdf file included with IDS).

Chudakov, D. M. et al., "Fluorescent Proteins and Their Applications in Imaging Living Cells and Tissues", Physiological Reviews, American Physiological Society, 2010, vol. 90, No. 3, pp. 1103-1163. [online] [retrieved on Jun. 1, 2016] [Retrieved from the internet at physrev.physiology.org/content/90/3/1103.long].

\* cited by examiner

HIGH-EFFICIENCY OBLIQUE ILLUMINATION SYSTEM FOR FLUORESCENCE EXCITATION AND DETECTION

BACKGROUND OF THE INVENTION

There are many analytical methodologies that rely on the excitation and detection of fluorescence. For example, it is possible to determine where and when genes are expressed in a developing organism using the technique of fluorescence microscopy. A hybrid gene can be created that combines the regulatory elements of a gene of interest with the genetic coding sequences of a fluorescent protein product (a fluorophore) gene. In this case, the hybrid gene is used to create a transgenic organism such that the fluorophore will be expressed in the same cells, at the same times, as a particular endogenous gene of interest, so that one may learn where and when that gene is expressed. In order to accomplish this analysis, bright light of a particular wavelength must be shone upon the sample (this light is sometimes refined using an "excitation filter"), and the resulting excitation wavelengths must be blocked from the observer such that different and dimmer fluorescent wavelengths can be observed (sometimes using an "emission filter"). A description of this technology and details about a multitude of fluorophores can be found in CHUDAKOV, D. M. et al., "Fluorescent Proteins and Their Applications in Imaging Living Cells and Tissues" in the Physiological Reviews of the American Physiological Society, 2010, which is hereby incorporated by reference in its entirety. A similar method and apparatus can be used to detect the composition of minerals and gemstones, and for a variety of other applications.

The traditional method for accomplishing fluorescence microscopy uses a very bright, polychromatic light source. The polychromatic light source is then filtered so as to block all of the wavelengths other than the specific ones needed to excite fluorescence, thus most of the light is wasted and discarded. The polychromatic light source is typically an arc lamp that consumes a lot of power, generates a lot of heat, may contain toxic materials such as mercury, and is short-lived. The filtered excitation light is then injected into the optical path, with an expensive, angled dichroic mirror in a method termed "epi-illumination". To accomplish this, an excitation filter, and an emission filter are inserted into the faces of a box to form a right angle, with a dichroic mirror between them. This arrangement of two filters and a mirror is called an "epi-fluorescence cube". Some losses are realized as the excitation light reflects off the mirror, at an angle, and further losses are realized as the emitted fluorescence must pass through the dichroic mirror, at an angle, to be seen by the observer. One convenient feature of epi-fluorescence is that it is possible to switch between different colored fluorophores quickly by sliding or rotating one cube out of the light path and another cube into the light path. Reichman discloses such a system in U.S. Pat. No. 6,414,805B1 "Reflected-light type fluorescence microscope and filter cassette used therefore". This system has several shortcomings. It relies on an inefficient, wasteful polychromatic light source, and it requires an expensive microscope specially designed for access into the light path to accommodate the cube changer system, and a cube changer system that fits a particular model of microscope. Another challenge and shortcoming of moveable optical elements (for example the cubes) is that they must be positioned precisely, over and over as the user switches back and forth between them. This typically requires some kind of a detent system. Traditional detent systems use spring-loaded elements that scrape along a surface until they fall into a depression at the appropriate point. Thus, these systems are subject to wear. Additionally, if too much force is used, such that a detent point is passed, there is nothing present to prevent the linear slider or rotary slider (turret) from moving much further.

As solid-state light sources, such as Light Emitting Diodes (LEDs) have become powerful and practical, prior art has used these longer-lived, less expensive light sources in place of the arc lamps. With LEDs, one option is to use a power-hungry multitude of polychromatic "white" LEDs aimed inefficiently into an expensive light pipe, and from there into the epi-fluorescence cube located within the special microscope. This has all of the problems described above except that LEDs are long-lived. Alternatively, light from a single LED with an appropriate narrow color spectrum can be injected into the optical path via epi-illumination. For example, in U.S. Pat. No. 7,502,164B2, Lytle discloses a "Solid state fluorescence light assembly and microscope". This system combines one single-colored LED into each of several changeable epi-fluorescence cubes. Unfortunately, this system requires the use of a highly specialized microscope that both allows for epi-illumination, and additionally has provisions for powering the LEDs built into the microscope. Furthermore, the available geometry to illuminate the specimen by epi-illumination limits illumination to one LED per cube. The prior art also contains examples of using one or more LEDs, of a single color, to illuminate the specimen obliquely. For example Mazel teaches of the "Stereo Microscope Fluorescence Adapter," on the web page www.nightsea.com/products/stereomicroscope-fluorescence-adapter/. This is a meager device that shines an LED's light on the specimen from a goose-neck lamp and blocks the excitation light with a manually installed filter plate. In US20070153372A1, Mazel discloses a "Fluorescence illumination method and apparatus for stereomicroscopes". This system uses only a single type of ultraviolet light LED to excite fluorescence that cannot be changed quickly and the fact that this device can mix in white light is not relevant for fluorescence detection. The system has no provisions for quickly analyzing multiple fluorophores that require provisions for different excitation and emission spectra. A significant drawback to prior single-colored LED direct illumination approaches is that it is nontrivial to switch between analyzing different fluorophores because LEDs, excitation filters, and emission filters, must all changed simultaneously, and prior art does not provide for this. Another problem is that individual LEDs are often not powerful enough to excite a useful level of fluorescent signal.

SUMMARY OF THE INVENTION

The current invention is a system that solves problems associated with using electromagnetic radiation sources, for example LEDs, to excite and analyze fluorescence. The system is a method and associated devices to practice the invention. A key feature of the invention is that it takes place independently and/or externally to any other piece of equipment. For example, if a microscope is used to observe fluorescence, the invention is located outside of the microscope and not dependent on interrupting the optical path of the microscope to excite the specimen or to filter the emission from the specimen. Elements of the invention may include the ability to rapidly and easily change between the combined excitation and analysis of different fluorophores via different modules and/or the ability to more intensely excite fluorophores through the use of modules producing multiple intersecting beams of electromagnetic radiation that converge at the specimen thus increasing excitation of a bona fide signal in the plane and location of the specimen while not increasing the background noise signal in other planes or locations.

Useful features that can contribute to the invention include the use of magnets to accurately position the modules via a moving element and the use of magnets to attach the modules to the moving element so that a user can rapidly configure the system to excite and analyze different fluorophores in different orders without the use of any tools.

BRIEF DESCRIPTION OF DRAWINGS

FIG. 1 represents one preferred embodiment of the illuminator. (1) is an enclosure pertaining to Light Emitting Diodes (LEDs) (101), (102), and (103). The light rays from these LEDs are collimated by optics (104), (105), and (106), respectively, and filtered by filters (19), (108), and (20), respectively. The resulting light beams, (110), (111), and (112), respectively, intersect and add at the observation plane (114), but not in planes in front of (for example, (113)) or behind (for example (115)) the sample plane of interest.

FIG. 2 represents one preferred embodiment of a High-efficiency Oblique Illumination System for Fluorescence Excitation and Detection for a multi-fluorophore fluorescence microscope system. Multi-LED lamp enclosure (1), with excitation filters (19) and (20) is further assembled to emission filter (2); similarly, multi-LED lamp enclosure (3), with excitation filters (21) and (22), different from (19) and (20), is further assembled to a different emission filter (4). These combined assembly modules of excitation light sources with emission filters are detachably attached to movable chassis (slider) (5). A stereo-microscope is represented by main body (12A), eyepieces (12B) and objective lens (12C). Slider-holder (10) positions the slider (5) in the optical path of the microscope. Through the use of handles (17) and (27), slider (5) can be translated in directions (18) and (28) by either pushing action or pulling action, such that either lamp/filter assemblies (1) plus (2) or (3) plus (4) are positioned below the optical path of the microscope and electrical contacts are established to energize the lamps within them via contacts (13) plus (14) or (15) plus (16), respectively. Optimal positioning of the slider is insured by the attractive force of slider magnets (6), (7), and (8) with stationary reference magnet (9) located in the slider-holder (10). The multi-LED lamps have beams aimed to converge at point (23) in the focal plane of the microscope. The spot (23) is also covered by the matching emission filter. Pivot screws (24) and (25) allow lamp enclosures (1) and (3), respectively, to pivot to precisely illuminate spot (23) when in the active position. For example, lamp enclosure (1) is in the active position when slider magnet (6) aligns with stationary reference magnet (9). Not shown in this figure, because they are blocked from view by slider (5), are adjustable jack screws coming toward the slider from enclosures (1) and (3) The heads of these jack screws hit slider (5) so that the tilt angles of lamp enclosures (1) and (3) to can be adjusted to precisely illuminate spot (23) when in the active position.

FIG. 3 is a drawing of an alternate embodiment of the invention with multiple lamps of various colors aimed at the sample of interest, orthogonally with respect to the axis of observation. A microscope, represented by its body (12A) and eyepiece tubes (12B) is focused at a location (209) where a specimen of interest would be in the center of the field of view of a stage plate (200). Excitation sources (203) and (204) project electromagnetic energy along intersecting beams (210) and (211) that intersect at the sample location (209). These beams are both at wavelengths that excite a particular fluorophore. Similarly, excitation sources (205) and (206) are both at wavelengths that excite a second fluorophore, and excitation sources (207) and (208) are both at wavelengths that excite a third fluorophore. A slider containing various emission filters (not shown) is positioned beneath microscope (12A). Each emission filter specifically blocks the excitation wavelengths emitted by a particular group of excitation lamps (such as (203) plus (204)) and allows the dimmer fluorescence to be seen via the microscope. Wired or wireless communication between the slider and the various excitation lamps is established so that the position of the slider coordinates the correct excitation lamps to be energized based on the emission filter positioned between microscope (12B) and stage plate (200). By substituting a different stage plate (200), or changing the rotational orientation of the stage plate, along with the slider or emission filters in the slider, it is possible to examine an arbitrarily large number of fluorophores.

FIG. 5 is a functional schematic comparing the prior art epi-illumination fluorescence dissecting stereomicroscope in panel 5A with the present invention's independent direct-illumination quick-change fluorescence system positioned below a standard dissecting stereomicroscope in panel 5B. In both 5A and 5B, an example is shown where a specimen (23) containing the fluorophore mCherry is illuminated by pure yellow light and the yellow light is blocked from reaching the eyepiece, allowing much dimmer red fluorescent light emitted by the specimen through to be observed. In both 5A and 5B, the microscope occupies the area of the dotted-line box and is represented by the Eyepiece (12B) and the Objective lens (12C): (604) and (603), respectively. In both 5A and 5B, the quickly-changeable fluorescence excitation and detection element occupies the area of the dashed-line box: (605) and (602), respectively. Note, in the prior art, that (605) interrupts the optical path of the microscope (604) and requires a special microscope that allows for this insertion; whereas, in the present invention, 5B, (602) is completely external to the microscope (603), so it can be used with any microscope model. In 5A, a polychromatic light source is external to and shines into module (605). The polychromatic light source is filtered by excitation filter (19), bounces off dichroic mirror (601), passes through objective lens (12C) and finally hits a specimen (23). In 5B, an integrated light source (101) that may have a spectrum more closely approximating the excitation spectrum of the specimen (23), is optionally refined by excitation filter (19) and shines directly on the specimen (23) without any need for a dichroic mirror or interruption of the optical path. In 5A, fluorescence emitted by specimen (23) passes through objective lens (12C), dichroic mirror (601) and emission filter (2) before reaching the eyepiece (12B). In 5B, fluorescence emitted by specimen (23) passes through emission filter (2) and then travels straight through the normal optical path of the microscope from objective lens (12C) to eyepiece (12B).

DETAILED DESCRIPTION OF PREFERRED EMBODIMENT

The current invention solves the problems associated with using electromagnetic radiation sources such as LEDs to excite and analyze fluorescence. Throughout this patent application, reference is made to "light", Light Emitting Diodes ("LEDs"), and "fluorescence"; however, it is to be understood that "light" is a metaphor and meant to include all electromagnetic wavelengths, including those which cannot be perceived by the human eye, and "LEDs" are just one example of a source of electromagnetic radiation (others include but are not limited to gas discharge lamps, x-ray and magnetron tubes, and a multitude of different types of lasers), and "fluorescence", though this word typically refers to the visible or invisible radiation emitted by certain substances as a result of incident radiation of a shorter wavelength such as X-rays or ultraviolet light, in this application is expanded and refers to any detectable phenomenon that results from excited molecules, for example it could be a change in nuclear spin in response to radio waves in a magnetic field.

It must be noted that as used herein and in the appended claims, the singular forms "a", "an", and "the" include plural referents unless the context clearly dictates otherwise. All publications mentioned herein are incorporated herein by reference to disclose and describe the methods and/or materials in connection with which the publications are cited. Further, the dates of publication provided may be different from the actual publication dates, which may need to be independently confirmed. Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

In addition to the use of single electromagnetic sources (for example LEDs) to excite atoms and/or molecules, it is possible to increase signal, and the signal-to-noise ratio, through the use of multiple single-colored LEDs shone upon the sample from different angles (oblique and/or orthogonal to the angle of observation), each with its own optical elements to focus and/or collimate it. Thus, the light from the LEDs does not need to be combined via complex optical elements, and no expensive light pipe is needed, resulting in reduced cost, complexity, and increased optical efficiency and cost efficiency. Since multiple beams converge at the point of interest in the observation focal plane, the excitation light is multiplied by the number of beams. Since the beams each strike the point of interest from a different oblique angle (or in another preferred embodiment, orthogonal angle), the illumination beams do not converge behind or in front of the point of interest, so the excitation light is not multiplied in other planes, resulting in reduced background fluorescence and an increase in the signal-to-noise ratio.

To solve the problem of quickly changing between fluorophores, the multitude of LEDs for each fluorophore and all associated optics, for example lenses and filters, can be housed inside a single lamp assembly, such that any of a multiple of lamp assemblies can be slid into the active position that illuminates the sample using a slider mechanism. Various multi-lamp assemblies can be quickly interchanged to create different sets and different orders due to a unique magnetic attachment mating structure that uses strong magnets and guideposts on the multi-lamp assemblies magnets of the opposite polarity and guide holes on the slider. We present one of many possible embodiments with a linear slide arrangement, but this does not exclude other embodiments such as a rotational slide arrangement, or still others. Significantly, this slider system of multiple lamp assemblies each containing elements to produce multiple-beams, is completely independent of the internal optical path of the microscope, so there is no requirement for a specially constructed microscope, and the current invention can be added on to any existing microscope.

For simplicity and cost-effectiveness, the slider mechanism disclosed is hand-powered and hand-operated. Nevertheless, the slider must stop at precise locations to align the optics, reproducibly. This is accomplished using strong magnets in the slider and in a reference element (such as the slider's supporting holder), such that magnets of opposite polarity align at the points where the slider needs to stop, creating a detent system to index the slider's movement. Not only does this draw the slider to the correct position and stop the slider, but also, in the event that the stop location is passed, it tends to draw the slider back into the correct stop location. Since only the stop locations of the preferred embodiment are magnetic or attracted by magnets, there is no force abrading or wearing the slider mechanism during the sliding operation (as compared with a typical spring-loaded ball/pin that is always under force, seeking a depression detent point).

Here are some features important in the construction of one preferred embodiment. Not every feature is required; in fact, using some features may make other features obsolete or contraindicated:

One preferred embodiment is a system for the excitation and detection of fluorescence, from various different fluorophores, underneath a dissecting stereomicroscope. Different fluorophores require different wavelengths of light to excite them, and then they emit different wavelengths of light as fluorescence that must be detected/visualized. For example, a fluorophore originally derived from a jelly fish protein, called eGFP, is best excited by light at a peak wavelength of about 488 nanometers (nm). eGFP then emits light at a peak wavelength of about 509 nm. eGFP can be excited using an LED that has a dominant wavelength in the neighborhood of about 470 nm because even "single-colored" LEDs tend to have a fairly broad spectrum. Even though an LED may be specified as "470 nm", it emits some light all the way from 430 nm to 530 nm. Therefore, any excitation light with wavelengths found in the emission spectrum, for example light that is over 500 nm, must be filtered out so that it does not overwhelm the emission signal. This can be accomplished with a pair of filters. Light from the LED can be filtered so that only light below 490 nm (blue) is allowed to pass to the sample, and light coming from the sample can be filtered such that only light that is over 500 nm (green) is allowed to pass on to the observer. Another fluorophore, named mCherry, is best excited by light with a wavelength of about 587 nm and emits the most light at approximately 610 nanometers. Appropriate LEDs, excitation filters, and emission filters can be chosen to show mCherry fluorescence, as well. More specific information about LEDs, and their dominant wavelengths, spectra, and power levels, etc. can be found in "Cree Xlamp XP-E2

LEDs" and this information is hereby incorporated by reference. More information about various fluorophores useful in biology research can be found in CHUDAKOV, D. M. et al., "Fluorescent Proteins and Their Applications in Imaging Living Cells and Tissues", Physiological Reviews, American Physiological Society, 2010, Vol. 90, No. 3, Pages 1103-1163, and is hereby incorporated by reference.

Figure 5:
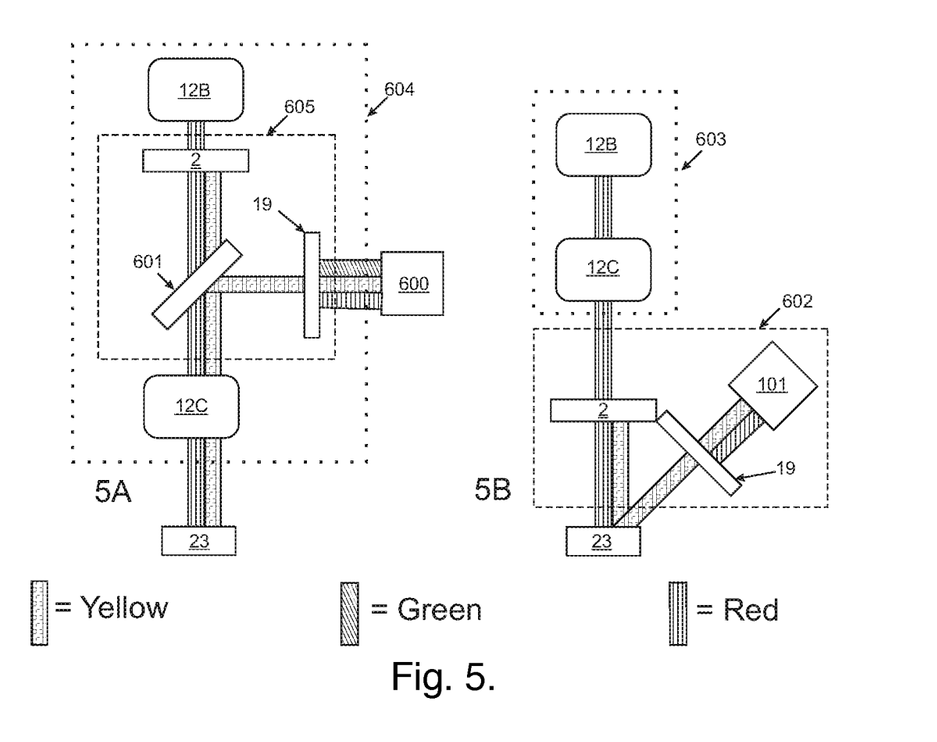

FIG. 5 shows an important, novel aspect of the invention and distinguishes it from prior art. A key feature of the invention is that it takes place independently and/or externally to any other piece of equipment. For example, if a microscope is used to observe fluorescence, the invention is located outside of the microscope and is not dependent on interrupting the optical path of the microscope to excite the specimen or to filter the emission from the specimen. FIG. 5 is a functional schematic comparing the prior art epi-illumination fluorescence dissecting stereomicroscope in panel 5A with the present invention's independent direct-illumination quick-change fluorescence system positioned below a standard dissecting stereomicroscope in panel 5B. In both 5A and 5B, an example is shown where a specimen (23) containing the fluorophore mCherry is illuminated by pure yellow light and the yellow light is blocked from reaching the eyepiece, allowing much dimmer red fluorescent light emitted by the specimen through to be observed. In both 5A and 5B, the microscope occupies the area of the dotted-line box and is represented by the Eyepiece (12B) and the Objective lens (12C): (604) and (603), respectively. In both 5A and 5B, the quickly-changeable fluorescence excitation and detection element occupies the area of the dashed-line box: (605) and (602), respectively. Note, in the prior art, that (605) interrupts the optical path of the microscope (604) and requires a special microscope that allows for this insertion; whereas, in the present invention, 5B, (602) is completely external to the microscope (603), so it can be used with any microscope model. In 5A, a polychromatic light source is external to and shines into module (605). The polychromatic light source is filtered by excitation filter (19), bounces off dichroic mirror (601), passes through objective lens (12C) and finally hits a specimen (23). In 5B, an integrated light source (101) that may have a spectrum more closely approximating the excitation spectrum of the specimen (23), is optionally refined by excitation filter (19) and shines directly on the specimen (23) without any need for a dichroic mirror or interruption of the optical path. In 5A, fluorescence emitted by specimen (23) passes through objective lens (12C), dichroic mirror (601) and emission filter (2) before reaching the eyepiece (12B). In 5B, fluorescence emitted by specimen (23) passes through emission filter (2) and then travels straight through the normal optical path of the microscope from objective lens (12C) to eyepiece (12B). Compared to the prior art, the preferred embodiment completely dispenses with the dichroic mirror (601) and the excitation light passes through two fewer optical elements.

In order to get enough light to effectively excite mCherry, multiple LEDs with a dominant output wavelength of about 585 nm, need to be collimated into beams, or focused to points. Light, which diverges from an LED source, can be captured and collimated using a typical optical means for that purpose, for example, a non-exhaustive list includes a plano-convex lens, a biconvex lens, a Fresnel lens, a reflector, an optic that makes use of total internal reflectance, or any combination thereof, to name a few possibilities, placed in front of the LED. This collimated beam can then be restricted efficiently, by a dichroic filter to below 600 nm. More specific and useful information about dichroic filter technology is found in Macleod, H. A. "Thin Film Optical Filters" and the entirety of this teaching is hereby incorporated by reference.

In biology research, it is often desirable to track the expression of one gene in relation to the expression of at least one other gene as a reference. Therefore, it is desirable to be able to analyze the expression of two or more fluorophores, in the same live, moving specimen, in rapid sequence. In some cases, the fluorophore expression will co-localize and it is important to be able to excite and detect each fluorophore individually. Therefore, a preferred embodiment includes one excitation module that emits electromagnetic radiation (in this case blue light) that is restricted to be less than 495 nanometers to excite a fluorophore such as eGFP without exciting a fluorophore such as mCherry, and a second excitation module that emits electromagnetic radiation (in this case green and/or yellow light) that is restricted to be greater than about 510 nanometers to excite a fluorophore such as mCherry without exciting a fluorophore such as eGFP.

Figure 1:
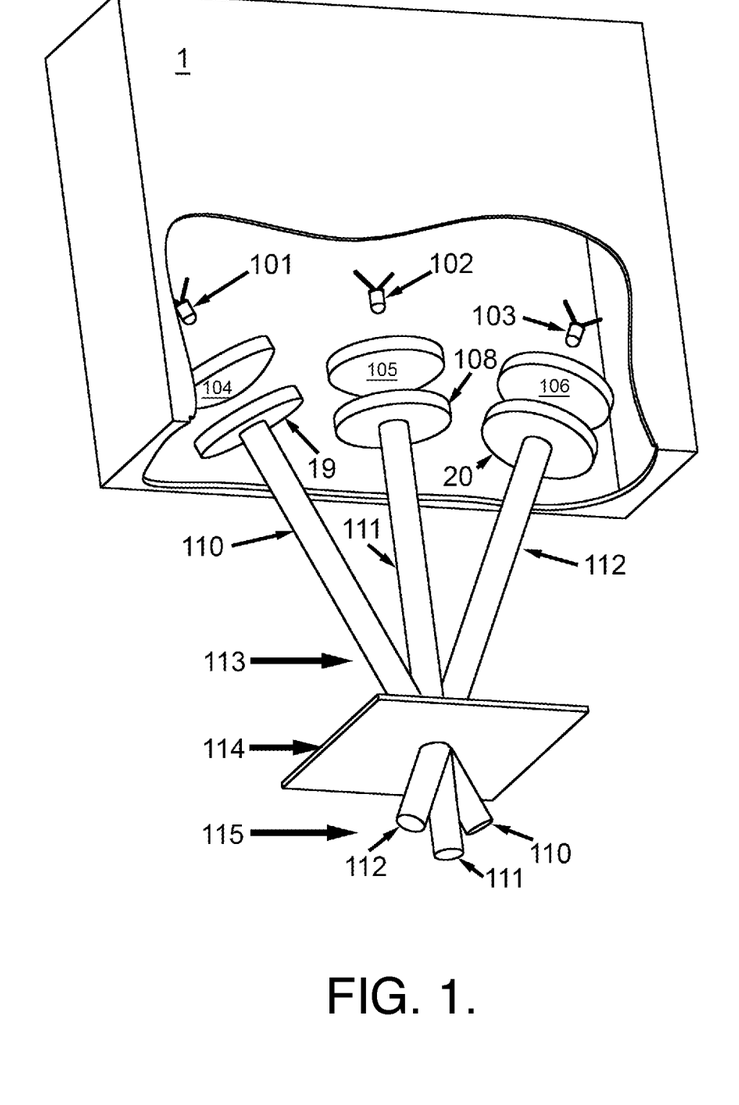

Each filtered beam can be aimed at the same point on the sample plane such that the beams intersect at that point. This results in a point, in the sample plane, where the brightness is multiplied by the number of LEDs. However, the point proximal to that point, and the point distal to that point do not have the same brightness multiplication, because the beams do not converge in other planes. This results in a significant decrease in background fluorescence, and an increase in the signal-to-noise ratio for the fluorophore present in the sample of interest. An example device to practice this method is shown in FIG. 1, where (1) is an enclosure pertaining to Light Emitting Diodes (LEDs) (101), (102), and (103). The light rays from these LEDs are collimated by optics (104), (105), and (106), respectively, and filtered by filters (19), (108), and (20), respectively. The resulting light beams, (110), (111), and (112), respectively, intersect and add at the observation plane (114), but not in planes in front of (for example, (113)) or behind (for example (115)) the sample plane of interest.

The bright spot of excitation light is removed from the visual field of the observer using another filter, such as a dichroic filter. The second filter does not allow the excitation wavelength through, but does allow the emission wavelength through. In the preferred embodiment, all of the optical elements described above are combined into a single relatively compact enclosure plus attached emission filter support. Means is also provided for the LEDs in such an enclosure to be energized selectively based on an external signal. This can be accomplished via sliding electrical contacts, inductive power coupling, switches, sensors, and other methods.

Figure 2:
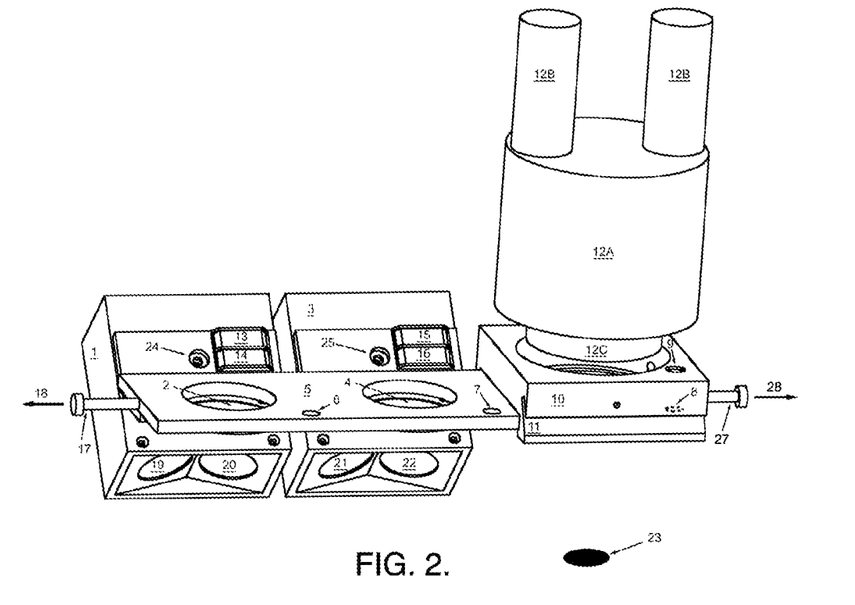
Figure 3:
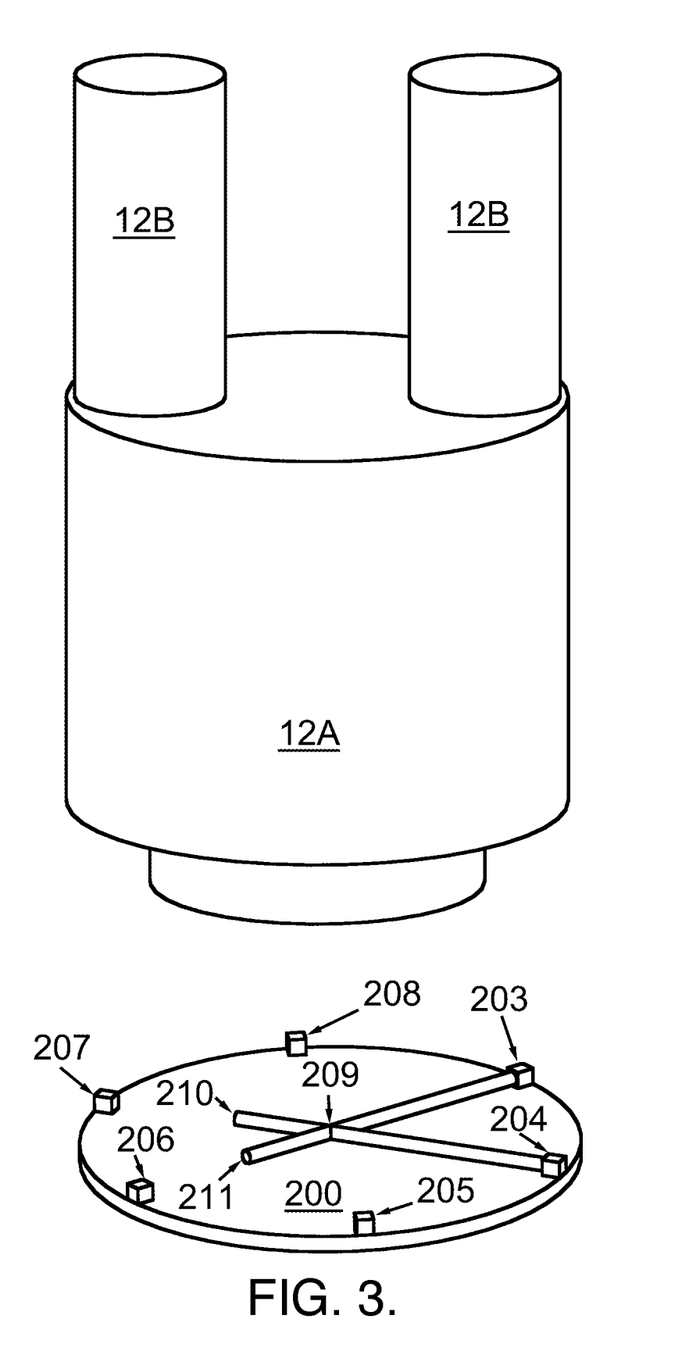

The preferred embodiment may include a slider mechanism that can be easily attached to structures just past the objective lens(es) of any microscope system. A multitude of the lamp assemblies can be attached to a linear slider of arbitrary length, or a rotational slider of arbitrary diameter. The preferred embodiment also employs a magnetic system for aligning the slider, and thus the lamp systems with their filters, between the objective lens and the sample, with high precision. Modules for eGFP, and for mCherry, and for a multitude of other fluorophores can be easily attached to the slider mechanism in the preferred embodiment. The user can switch between analyses of these different fluorophores simply by sliding the module of interest into the active position, using the slider. FIG. 2 and FIG. 3 provide examples.

FIG. 2 represents one preferred embodiment of a High-efficiency Oblique Illumination System for Fluorescence Excitation and Detection for a multi-fluorophore fluorescence microscope system. Multi-LED lamp enclosure (1), with excitation filters (19) and (20) is further assembled to emission filter (2); similarly, multi-LED lamp enclosure (3), with excitation filters (21) and (22), different from (19) and (20), is further assembled to a different emission filter (4). These combined assembly modules of excitation light sources with emission filters are detachably attached to sliding chassis (5). A stereo-microscope is represented by main body (12A), eyepieces (12B) and objective lens (12C). Slider-holder (10) positions the slider (5) in the optical path of the microscope. Through the use of handles (17) and (19), slider (5) can be translated in directions (18) and (20) by either pushing action or pulling action, such that either lamp/filter assemblies (1) plus (2) or (3) plus (4) are positioned below the optical path of the microscope and electrical contacts are established to energize the lamps within them via contacts (13) plus (14) or (15) plus (16), respectively. Optimal positioning of the slider is insured by the attractive forces of slider detent magnets (6), (7), and (8) with stationary reference magnet (9) located in the slider-holder (10). The multi-LED lamps have beams aimed to converge at point (23) in the focal plane of the microscope. The spot (23) is also covered by the matching emission filter. Pivot screws (24) and (25) allow lamp enclosures (1) and (3), respectively, to pivot to precisely illuminate spot (23) when in the active position. For example, lamp enclosure (1) is in the active position when slider magnet (6) aligns with stationary reference magnet (9). Not shown in this figure, because they are blocked from view by slider (5), are adjustable jack screws coming toward the slider from enclosures (1) and (3) The heads of these jack screws hit slider (5) so that the tilt angles of lamp enclosures (1) and (3) to can be adjusted to precisely illuminate spot (23) when in the active position.

Though LEDs represent one of the most energy-efficient forms of light generation, high-brightness LEDs still generate considerable heat that must be dissipated to prevent malfunctions. One preferred embodiment accomplishes this thermal dissipation by thermally coupling the LEDs to thermally conductive aiming mechanisms, which are in turn coupled to a thermally conductive enclosure.

The preferred embodiment requires means to accurately aim the convergence spot of the multi-LED lamp assemblies at the same point in the center of the microscope's field of view. This can be accomplished by varying the angle of the lamp in two polar axes, often termed theta and phi. Left-right aiming can be accomplished by rotating the lamp assembly (yaw in the theta axis) when it is attached to its bracket by a single screw located at the left-right center, provided that means are provided for sufficient friction to prevent the lamp from rotating due to accidental bumping, vibration, inertia, etc. Elements (24) and (25) of FIG. 2 provide an example. Up-down aiming (pitch adjustment in the phi axis) can be accomplished by use of a jack screw that pushes against a hinge that is under constant force due to, for examples, gravity or a spring. Within each multi-LED lamp assembly, each LED must be aimed so that its beam converges at the same spot. This aiming requires high precision because the LEDs and optical elements are small. The preferred embodiment provides sliding and rotating degrees of freedom for each LED's aiming support that glide on thermally conductive grease.

While it is possible for two hard items to slide against each other, this generally causes abrasion and wear. The preferred embodiment prevents such wear by making the slider of a bearing material, such as Polytetrafluoroethylene, Polyoxymethylene, etc. and the slider's holder out of a hard, durable material such as anodized aluminum or stainless steel. An alternate preferred embodiment swaps the above material types between the slider and its slider holder. As mentioned earlier, a preferred embodiment uses magnets to stop the slider or turret at points where modules are aligned to excite and analyze a specimen; therefore, neither the slider-holder nor the slider can be made from a ferromagnetic material.

Because there are a multitude of fluorophores, each having its own specific excitation and emission wavelengths, a multitude of lamp/filter assemblies are needed, and it is desirable for users to be able to exchange the assemblies quickly and conveniently. In one preferred embodiment, this is accomplished through magnetic attachment so that no tools or conventional fasteners are needed. Each module includes a bracket with two strong magnets and two guide posts. The slider that receives the modules has two guide holes in locations spaced to receive the two module guide pins, with two magnets of opposite polarity to attract and hold the module's magnets creating a mating structure. Thus no tools are required to install, remove, or change the modules. Alternatively, one or multiple guide post(s) can be exchanged to guide hole(s) and magnetic polarities can be changed in any arrangement allowing for attachment of the modules to the slider. So that users can quickly identify which module is associated with a particular fluorophore, the modules are color-coded with the color of the fluorescence emission. For example, the module that is used for exciting and detecting Green Fluorescent Protein is colored green and the module that is used for exciting and detecting mCherry protein is colored cherry-red.

To fit the available geometry of dissecting-type stereomicroscopes, it is desirable that modules can deliver small collimated spots of light at a distance in the range of 20 millimeters to 200 millimeters. The preferred embodiment accomplishes this with a pair of convex lenses with a combined focal length in the range of 20 millimeters to 200 millimeters. Alternative preferred embodiments use optical elements based on the principle of Total Internal Reflectance or reflection alone or in combination with refraction.

A preferred embodiment for quickly changing between fluorophores, using orthogonal, rather then oblique, excitation illumination is shown in FIG. 3. In this case, it is geometrically simpler to physically separate the excitation sources from the emission filters; however they still communicate via wires or wirelessly so that appropriate excitation sources are energized, based on the emission filter chosen by the user. FIG. 3 is a drawing of an alternate embodiment of the invention with multiple lamps of various colors aimed at the sample of interest, orthogonally with respect to the axis of observation. A microscope, represented by its body (12A) and eyepiece tubes (12B) is focused at a location (209) where a specimen of interest would be in the center of the field of view of a stage plate (200). Excitation sources (203) and (204) project electromagnetic energy along intersecting beams (210) and (211) that intersect at the sample location (209). These beams are both at wavelengths that excite a particular fluorophore. Similarly, excitation sources (205) and (206) are both at wavelengths that excite a second fluorophore, and excitation sources (207) and (208) are both at wavelengths that excite a third fluorophore. A slider containing various emission filters (not shown) is positioned beneath microscope (12A). Each emission filter specifically blocks the excitation wavelengths emitted by a particular group of excitation lamps (such as (203) plus (204)) and allows the dimmer fluorescence to be seen via the microscope. Wired or wireless communication between the slider and the various excitation lamps is established so that the position of the slider coordinates the correct excitation lamps to be energized based on the emission filter positioned between microscope (12B) and stage plate (200). By substituting a different stage plate (200), or changing the rotational orientation of the stage plate, along with the slider or emission filters in the slider, it is possible to examine an arbitrarily large number of fluorophores.

Figure 4:
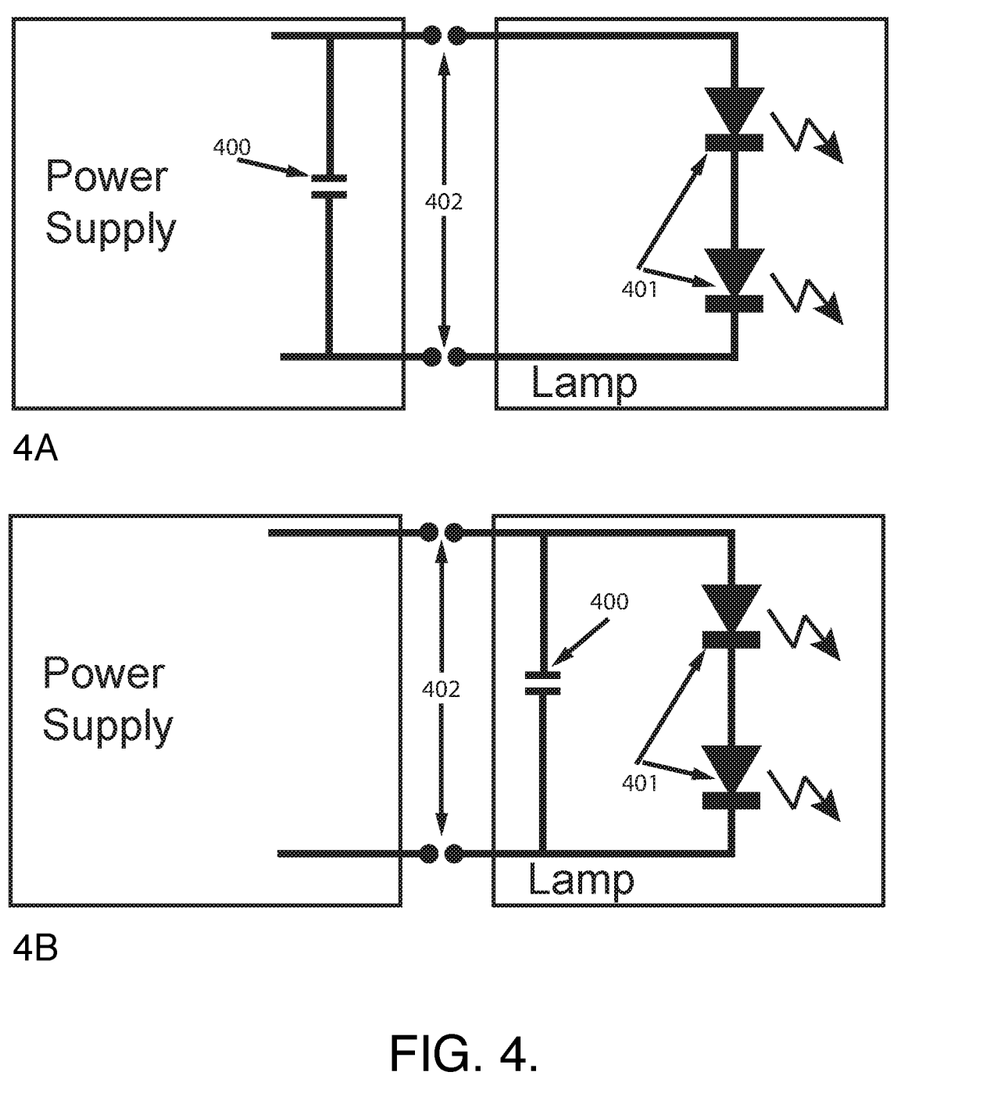
FIG. 4 is a schematic of a power supply and lamp assembly in two different configurations. In panel 4A, the typical configuration is shown, with a capacitor (400) inside the power supply to stabilize the power supply's voltage output. In panel 4B, an improvement to protect the LEDs is shown. When LEDs (401) are connected directly across a live power supply, by direct connection of contacts (402), this is termed "hot-plugging. In panel 4B, the capacitor (400) is moved from the power supply to the lamp assembly. This protects the LEDs (401) from current in-rush during the time that the power supply adjusts its voltage to provide a constant current level to the LEDs when hot-plugging.

One preferred embodiment directly energizes LEDs in the lamp assemblies by sliding electrical contacts on the lamp assembly against powered electrical contacts that are stationary on the slider holder. This presents a problem for conventional constant-current power supply designs because there is a high instantaneous in-rush of electrical current before the power supply can sense the voltage needed for proper current. This current in-rush can damage LEDs. In a preferred embodiment, this problem is dealt with inexpensively by relocating capacitors that stabilize the output of the power supply from the power supply to the lamp assemblies as shown in FIG. 4. FIG. 4 is a schematic of a power supply and lamp assembly in two different configurations. In panel 4A, the typical configuration is shown, with a capacitor (400) inside the power supply to stabilize the power supply's voltage output. In panel 4B, an improvement to protect the LEDs is shown. When LEDs (401) are connected directly across a live power supply, by direct connection of contacts (402), this is termed "hot-plugging. In panel 4B, the capacitor (400) is moved from the power supply to the lamp assembly. This protects the LEDs (401) from current in-rush during the time that the power supply adjusts its voltage to provide a constant current level to the LEDs when hot-plugging. More information about this is included in the cited reference by Cree, Inc., "LED Electrical Overstress", the entirety of which is hereby incorporated by reference.

The above listed features taken all together might seem to be a complicated invention, but when taken in meaningful subsets, the novelty of the invention becomes clear. Specific methods and devices of a High-efficiency Oblique Illumination System for Fluorescence Excitation and Detection have been disclosed. It should be apparent, however, to those skilled in the art that many more modifications besides those already described are possible without departing from the inventive concepts herein. The inventive subject matter, therefore, is not to be restricted to the examples mentioned in the disclosure. Moreover, in interpreting the disclosure, all terms should be interpreted in the broadest possible manner consistent with the context. In particular, the words should be interpreted as referring to elements, components, or steps in a non-exclusive manner, indicating that the referenced elements, components, or steps may be present, or utilized, or combined with other elements, components, or steps that are not expressly referenced.

I claim:

1. A device for fluorescence excitation and detection comprising:
   a moveable chassis having at least two electromagnetic energy emitter modules mounted thereupon, said modules positioned outside of the field of view to a specimen with respect to a point of observation, for providing said excitation directly to said specimen by at least one of said modules along lines not parallel to the line between said point of observation and said specimen; and
   at least two elements mounted thereupon said chassis, such that at least one of the elements can be positioned inside said field of view to said specimen, providing filtration to detect a signal emitted from said specimen in response to said excitation; and
   devoid of a dichroic mirror located in said field of view to a specimen with respect to a point of observation;
      wherein at least one of said electromagnetic energy emitter modules is concomitantly triggered to illuminate said specimen by the position of said at least one of the elements providing filtration.

2. A device as in claim 1 wherein said chassis is movably mounted to a point external to an optical system such as a microscope.

3. A device as in claim 1 wherein each of said modules is combined with one of the filtration elements onto a sub-chassis that is removable from said chassis.

4. A device as in claim 1 wherein at most one of said modules emits useful electromagnetic energy at any given time.

5. A device as in claim 1 wherein at least one module of said electromagnetic energy emitter modules is comprised of: at least two sources of electromagnetic radiation; said sources of electromagnetic radiation shone at essentially the same point.

6. A device as in claim 1 wherein said chassis includes at least one detent comprising at least one of: a magnetic element; and a ferromagnetic element; to position said chassis with respect to at least one of: a magnetic element; and a ferromagnetic element; not located on said chassis.

7. A device as in claim 1 wherein said modules are removably attached to said chassis via a magnetic mating structure.

8. A device for fluorescence excitation and detection comprising:
   a movable chassis upon which at least two different emission filters are mounted such that any one of said at least two different emission filters can be positioned inside the field of view of a specimen with respect to a point of observation to detect fluorescence, by moving said chassis; and
   at least two electromagnetic excitation sources, at least one of which, appropriate to the emission filter placed into said field of view by moving said chassis, is concomitantly triggered to illuminate said specimen; and
   said at least two electromagnetic excitation sources provide appropriate illumination to said specimen, directly, from outside of said field of view; and
   devoid of a dichroic mirror located inside said field of view of a specimen with respect to a point of observation.

9. A device as in claim 8 wherein said chassis is mounted to a point in relation to the exterior of a microscope.

10. A device as in claim 8 wherein said chassis includes at least one detent comprising at least one of: a magnetic element; and a ferromagnetic element; to position said chassis with respect to at least one of: a magnetic element; and a ferromagnetic element; not located on said chassis, for alignment of said chassis with respect to said field of view.

11. A device as in claim 8 wherein said chassis moves in at least one of: a linear fashion; and a rotary fashion.

12. A device as in claim 8 wherein a member of said emission filters is paired with a member of said electromagnetic excitation sources onto a sub-chassis module that is removable from said chassis.

13. A device as in claim 12 wherein at most one said module emits useful electromagnetic energy at any given time.

14. A device as in claim 12 wherein at least one said module includes at least two sources of similar wavelength electromagnetic radiation; the sources shone at essentially the same point.

15. A device as in claim 12 wherein said modules are removably attached to said chassis via a magnetic mating structure.

16. A device for rapid analysis of multiple fluorophores possessing distinct excitation and emission spectra via an optical system, such as a microscope, wherein all components of the device reside outside the optical system, said device comprising:
- a moveable chassis with at least one detent; and
- an element not located on said moveable chassis to engage and index said detent with respect to the optical path between the point of observation and a specimen; and
- mating structures located on said chassis to receive and removably attach and align at least two distinct fluorescence analysis modules with respect to said detent; and
- fluorescence analysis modules comprising:
  - excitation sources formulated to emit light related to the excitation spectrum of a particular fluorophore; and
  - filters formulated to transmit the spectrum of light emitted by the excitation sources; and
  - filters formulated to analyze the spectrum of light emitted by said fluorophore; and
  - structures to removably attach and align the modules to said chassis via said mating structures; and
  - means to energize a particular module when said module is aligned to said optical path; and
  - compact heat-dissipating enclosures.

17. A device as in claim 16 wherein said fluorescence analysis modules include at least two sets of excitation sources and associated optics aligned so that their concentrated emitted light beams intersect in the plane of a sample of interest but diverge before and after intersecting that plane.

18. A device as in claim 16 wherein magnets are positioned to align said mating structures on said movable chassis with said optical path of said optical system.

19. A device as in claim 16 wherein magnets are positioned for automatic alignment plus removable attachment of said fluorescence analysis modules to said mating structures on said movable chassis without the need for any tools.

* * * * *